(12) United States Patent
Goyal et al.

(10) Patent No.: US 10,409,911 B2
(45) Date of Patent: Sep. 10, 2019

(54) SYSTEMS AND METHODS FOR TEXT ANALYTICS PROCESSOR

(71) Applicant: Cavium, LLC, Santa Clara, CA (US)

(72) Inventors: Rajan Goyal, Saratoga, CA (US); Ken Bullis, Los Altos, CA (US); Satyanarayana Lakshmipathi Billa, Sunnyvale, CA (US); Abhishek Dikshit, San Jose, CA (US)

(73) Assignee: Cavium, LLC, Santa Clara, CA (US)

( * ) Notice: Subject to any disclaimer, the term of this patent is extended or adjusted under 35 U.S.C. 154(b) by 273 days.

(21) Appl. No.: 15/582,408

(22) Filed: Apr. 28, 2017

(65) Prior Publication Data
US 2017/0315984 A1   Nov. 2, 2017

Related U.S. Application Data

(60) Provisional application No. 62/329,970, filed on Apr. 29, 2016.

(51) Int. Cl.
*G06F 17/27*  (2006.01)
*G06F 16/35*  (2019.01)

(52) U.S. Cl.
CPC ............ *G06F 17/277* (2013.01); *G06F 16/35* (2019.01); *G06F 17/2705* (2013.01); *G06F 17/2785* (2013.01)

(58) Field of Classification Search
CPC combination set(s) only.
See application file for complete search history.

(56) References Cited

U.S. PATENT DOCUMENTS

2016/0378853 A1* 12/2016 Mohammad ........ G06F 16/3344
                                                                 707/706

OTHER PUBLICATIONS

Stephen Merity; Integrated Tagging and Pruning via Shift-Reduce CCG Parsing; School of Information Technologies The University of Sydney, Australia Nov. 7, 2011 (Year: 2011).*
Wegman, Mark; Parsing for structural editors; 21st Annual Symposium on Foundations of Computer Science (sfcs 1980) Foundations of Computer Science, 1980., 21st Annual Symposium on. Oct. 1980; pp. 320-327 (Year: 1980).*

* cited by examiner

*Primary Examiner* — Abul K Azad (57) ABSTRACT

A hardware-based programmable text analytics processor has a plurality of components including at least a tokenizer, a tagger, a parser, and a classifier. The tokenizer processes an input stream of unstructured text data and identifies a sequence of tokens along with their associated token ids. The tagger assigns a tag to each of the sequence of tokens from the tokenizer using a trained machine learning model. The parser parses the tagged tokens from the tagger and creates a parse tree for the tagged tokens via a plurality of shift, reduce and/or finalize transitions based on a trained machine learning model. The classifier performs classification for tagging and parsing by accepting features extracted by the tagger and the parser, classifying the features and returning classes of the features back to the tagger and the parser, respectively. The TAP then outputs structured data to be processed for various text analytics processing applications.

34 Claims, 11 Drawing Sheets

SYSTEMS AND METHODS FOR TEXT ANALYTICS PROCESSOR

CROSS-REFERENCE TO RELATED APPLICATIONS

This application claims the benefit of U.S. Provisional Patent Application No. 62/329,970, filed Apr. 29, 2016, and entitled "SYSTEMS AND METHODS FOR TEXT ANALYTICS PROCESSOR," which is incorporated herein in its entirety by reference.

BACKGROUND

Text analytics refers to a set of linguistic, statistical and/or machine learning techniques that model and structure information content of textual sources for business intelligence, data analysis and research. Such techniques extract structured information from a vast quantity of unstructured information present in human languages and enable computers to make sense out of a sea of unorganized data available on the Web.

At a high level, text analytics of data includes but is not limited to one or more of the following functionalities:

Information retrieval, which extracts and summarizes a relevant set of data from a huge set of data for analysis;
Named entity recognition (NER), which identifies named text features in the data such as people, organizations, places, products, date, and/or stock ticker symbol;
Co-reference, which identifies terms in the data that refer to the same object;
Sentiment analysis, which extracts various forms of attitudinal information such as opinion, mood and emotion from the data, wherein such sentiment can be localized at entity or clause level or across the entire set of data;
Relationship extraction, which establishes relationships between different entities.

Text analytics has a wide range of applications, which include but are not limited to media monitoring, survey/customer feedback monitoring, security, compliance, financial transactions, ad insertion, fraud detection, and real time streaming data. All of the applications require deriving high-quality information from a wide variety of unstructured or semi-structured data in huge volume that needs to be processed quickly in real time. Performing text analytics on such a big data task can be very intensive in terms of consumed computing resources. It is thus desirable to have a dedicated text analyzer to handle the task in an efficient manner.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A hardware-based programmable text analytics processor (TAP) having a plurality of components is proposed, wherein the TAP comprises at least a tokenizer, a tagger, a parser, and a classifier. The tokenizer processes an input stream of unstructured text data and identifies a sequence of tokens, which correspond to words in the input stream, along with their associated token ids. The tagger assigns a tag to each of the sequence of tokens from the tokenizer using a trained machine learning model. The parser parses the tagged tokens from the tagger and creates a parse tree for the tagged tokens via a plurality of shift and/or reduce transitions based on a trained machine learning model. The classifier performs classification for tagging and parsing by accepting features extracted by the tagger and the parser, classifying the features and returning classes of the features back to the tagger and the parser, respectively. The TAP then outputs structured data to be processed for various text analytics processing applications.

Since the TAP is implemented in hardware, it is configured to convert large volumes of unstructured data into structured data for text analytics in real time. In addition, since components of the TAP are programmable with various machine learning models, the TAP is flexible with respect to various text analytics applications. Specifically, a text analytics processing pipeline of one or more components of the TAP can be formed for each text analytics application, wherein the text analytics application controls starting and ending points of the pipeline as well as features to be extracted and classified for the text data.

Figure 1:
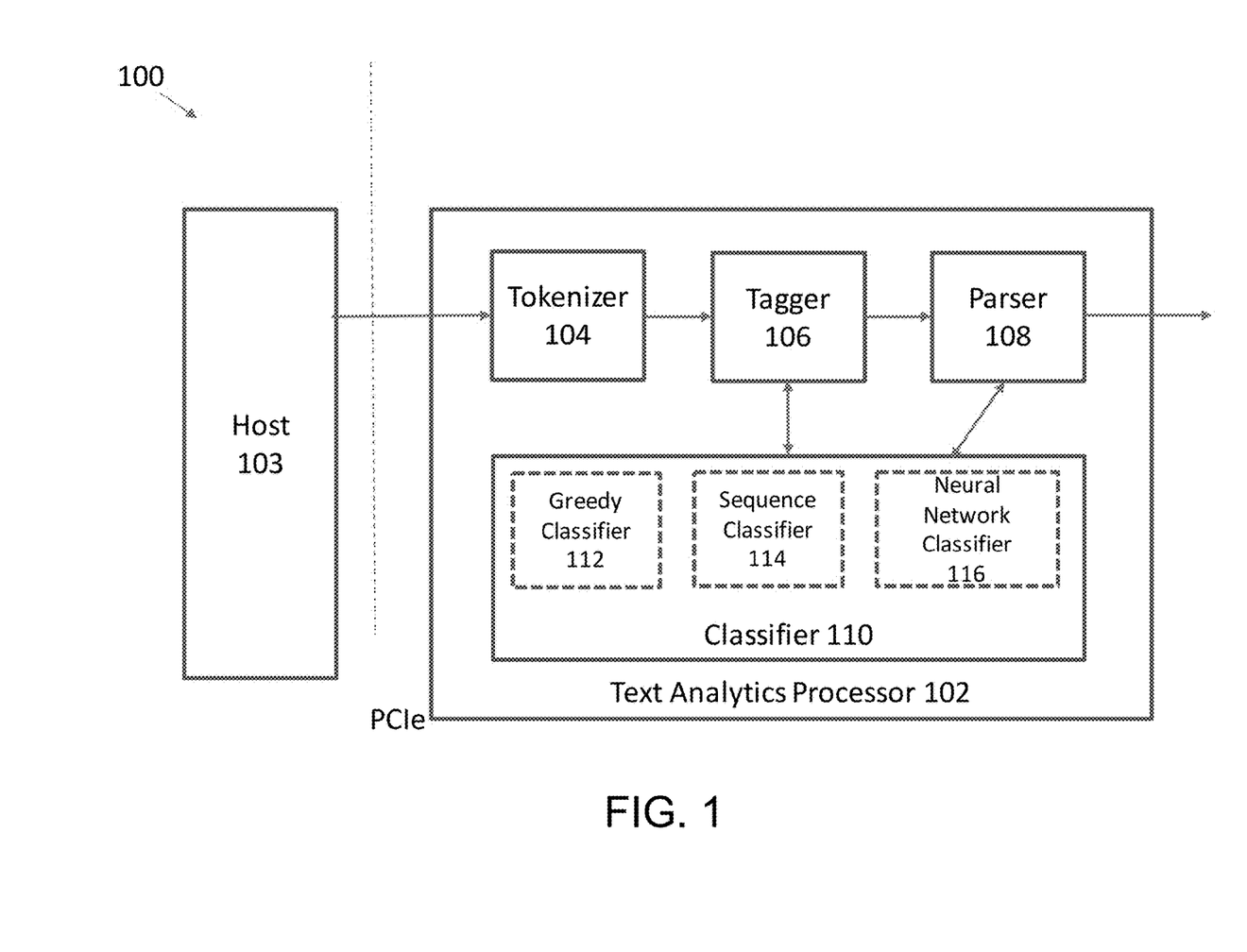
FIG. 1 depicts an example of a diagram of a system configured to support hardware-based text analytics processing in accordance with some embodiments.

FIG. 1 depicts an example of a diagram of a system 100 configured to support hardware-based text analytics processing. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a hardware-based programmable text analytics processor (TAP) 102, wherein the TAP 102 further includes a pipeline of plurality of hardware components/blocks of at least a tokenizer 104, a tagger 106, a parser 108, and a classifier 110. Here, the tokenizer 104, the tagger 106, the parser 108, and the classifier 110 are dedicated hardware blocks/components each including one or more microprocessors and on-chip memory units storing software instructions programmed by a user. When the software instructions are executed by the microprocessors, each of the hardware components becomes a special purposed hardware component for practicing certain text analytics functions as discussed in details below.

During its operation, the TAP 102 is configured to accept instructions from a host 103 and submit the instructions to the respective hardware components in the pipeline. Here, the host 102 can be, but is not limited to, an x86, MIPS, or ARM based device/system/server. The interface between the TAP 102 and the host 103 can be but is not limited to a Peripheral Component Interconnect Express (PCIe) bus.

For text analytics processing, the host 103 is configured to utilize each of the tokenizer 104, the tagger 106, the parser 108, and the classifier 110 independently by providing separate instructions to each of the components. In some embodiments, formats of the instructions are different for different components, wherein the first word in each instruction contains information about the component the instruction is intended for and an opcode within the component. In some embodiments, the host 103 is configured to form a text analytics processing pipeline of the components in any order that is suited for a text analytics functionality/application (e.g., sentiment analysis, named entity recognition, summarization, categorization, relationship extraction, etc.) by providing the output from one component in the pipeline as input to the next component in the pipeline. For non-limiting examples, the tokenizer 104 is configured to read ASCII/UTF-8 text and output tokens, the tagger 106 is configured to read the output from the tokenizer 104 or an output of a previous tagging stage and output another tag for each token, the parser 108 is configured to read the output of the tokenizer 104 or the tagger 106 and produce parse trees.

Depending on the text analytics application, different machine learning models/approaches are used at different phases/components of the TAP 102. For non-limiting examples, such models/approaches include but are not limited to Conditional Random Fields (CRF) for NER and parts of speech (POS) tagging (e.g., "Lincoln" tagged as a proper noun) and other tagging (e.g., noun phrases tagged as named entities), maximum-entropy Markov model (or conditional Markov model) for POS tagging, Naive Bayes, probabilistic models, averaged perceptron, neural networks, linear models, and sequencing models for parsing. Here, the probabilistic models are a generic block and can be used in isolation or as a part of the pipeline.

In some embodiments, machine learning based text analytics by the various phases of the TAP 102, e.g., the tagger 106 and/or the parser 108, operate in the following way. First, a user picks a set of training documents and a machine learning approach/algorithm that are most suitable to a specific phase of the pipeline. The user then extracts useful features of items to be classified in the training documents and manually assigns classes to those features. For a non-limiting example, the items to be classified can be words in a document and the classes can be POS, named entities, etc. Using the manually classified training documents, the user trains a model using the machine learning algorithm picked in the step above. At runtime, a component of the TAP 102, e.g., the tagger 106 and/or the parser 108, is configured to classify an un-classified document using the above trained machine learning model by extracting the features used to train the model from the un-classified document, look up the feature values in the trained model, compute/predict output values from the trained machine learning model, and classify the un-classified document using the computed values in the above step.

In the example of FIG. 1, the tokenizer 104 is configured to process an input payload/stream of unstructured text data and identify a sequence of tokens, which correspond to words in the payload along with their associated token ids for further processing. In some embodiments, the tokenizer 104 is configured to identify the tokens in the payload of text data via a regular expression-based approach by traversing a pre-built deterministic finite automaton (DFA) graph, which is compiled (e.g., by a software compiler) based on one or more user-specified regular expressions and their respective actions and is loaded into the tokenizer 104 for tokenization. Such a regular expression-based approach can identify words, dates, web addresses, email addresses and other uniquely identifiable entities quickly and is most suitable for languages (e.g., English, Hindi and Latin) where the words are delimited and word boundaries are defined. In some embodiments, the DFA graph comprises compressed DFA nodes each containing arcs pointing to the next nodes. If a DFA node is a marked node that represents a token, the DFA node is prepended by marked node information. If a DFA node has trailing context, the starting node pointer of the trailing context is also prepended to the node. In some embodiments, the tokenizer 104 is configured to match the trailing contexts of nodes and report all matches instead of the longest match.

In some embodiments, the tokenizer 104 is configured to identify the tokens in the payload of text data by identifying word boundaries via a language model-based approach by adopting a model for a specific language during tokenization or segmentation. Such a language model-based approach is suitable for languages where word boundaries are not defined, but are context based, wherein such languages include, for non-limiting examples, Chinese, Japanese, Vietnamese, Thai and Lao.

In the example of FIG. 1, the tagger 106 is configured to accept the stream of tokens (e.g., segmented words) or "tokens" output by the tokenizer 104 or a previous tagging process as input, assign a tag to each of the tokens using a pre-built/trained machine learning model, and send the tagged tokens to the next stage for further processing. Here, each tag can be but is not limited to part of speech, named entity, sentiment, relation, etc. A training module of the tagger 106 is configured to train the machine learning model and compute model data as discussed above, which is then used by the tagger 106 for tagging. In some embodiments, the tagger 106 extracts features for a token in order to assign a tag to it based on one or more feature identifiers, which can be loaded into a model data table of feature identifiers by software. A particular feature identifier can be a uni-gram, a bi-gram, a tri-gram or an n-gram, and may occupy multiple entries in the table. In some embodiments, the tagger 106 is configured to tag and attach multiple (e.g., up to 8) tags for a given token in the stream. The tagger 106 is also configured to attach multiple top-rated (e.g., top eight) possible tags from the classifier 110 as discussed below.

In some embodiments, the tagger 106 is configured to examine and extract characteristics or features of not only the current token/word but also its immediate and/or subsequent neighbors when assigning a tag to the token. Here, usual features examined by the tagger 106 can be word-based, which includes current word, next word, previous word, previous to previous word and/or a combination, class-based, which includes class of previous word, previous to previous word and/or a combination of classes and classes with words, and/or based on micro analysis of the words, which include N-byte prefix, N-byte suffix and/or shape of the word. In some embodiments, the tagger 106 is also configured to examine certain unusual features of a token/word, wherein such unusual features include, for non-limiting examples, assertive features of the word, such as the word having upper/lower case letters, digits or hyphens, and/or the word at the beginning of sentence or not, distribution similarity of a word, and class bias. In some embodiments, the tagger 106 is configured to use any or all of these types of feature together in categorizing a token/word. Note that the features used for tagging or classification should be same as the ones used for generating the model data.

In some embodiments, the tagger 106 is a Part-of-Speech (POS) tagger, which is configured to read text in a certain language and assign a part of speech tag, such as a noun, verb, adjective, etc., to each word or token in the text. Here, the tagger 106 is configured to perform such POS tagging via one or more of machine learning methods including but not limited to averaged perceptron, maximum entropy, conditional random field, and Naïve Bayes.

Figure 2:
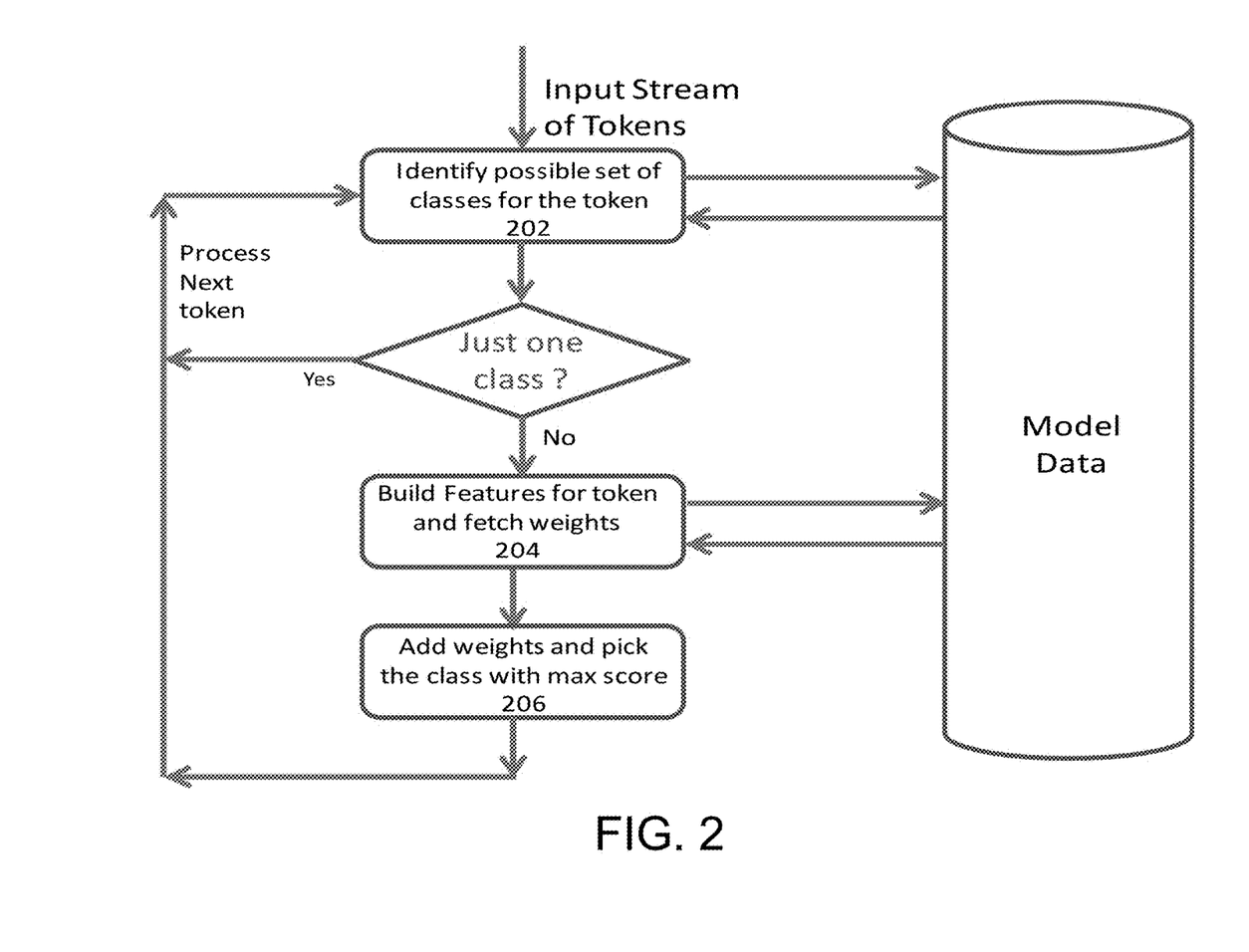
FIG. 2 depicts a flowchart of an example of a process to support greedy tagging/classification in accordance with some embodiments.

In some embodiments, the tagger 106 is configured to tag the stream of tokens one token at a time via greedy tagging by utilizing a greedy classifier 112 of the classifier 110. FIG. 2 depicts a flowchart of an example of a process to support greedy tagging/classification. As shown by the example of FIG. 2, the greedy classifier 112 is configured to identify possible classes for each of the stream of tokens received by the tagger 106 at Step 202. If more than one class has been identified for the token, the greedy classifier 112 is configured to build features for one or more identifiers for the token and fetch weights of the feature identifiers from the model data table discussed above at Step 204. The greedy classifier 112 then adds the weights together and picks the class having the highest score at Step 206.

Figure 3:
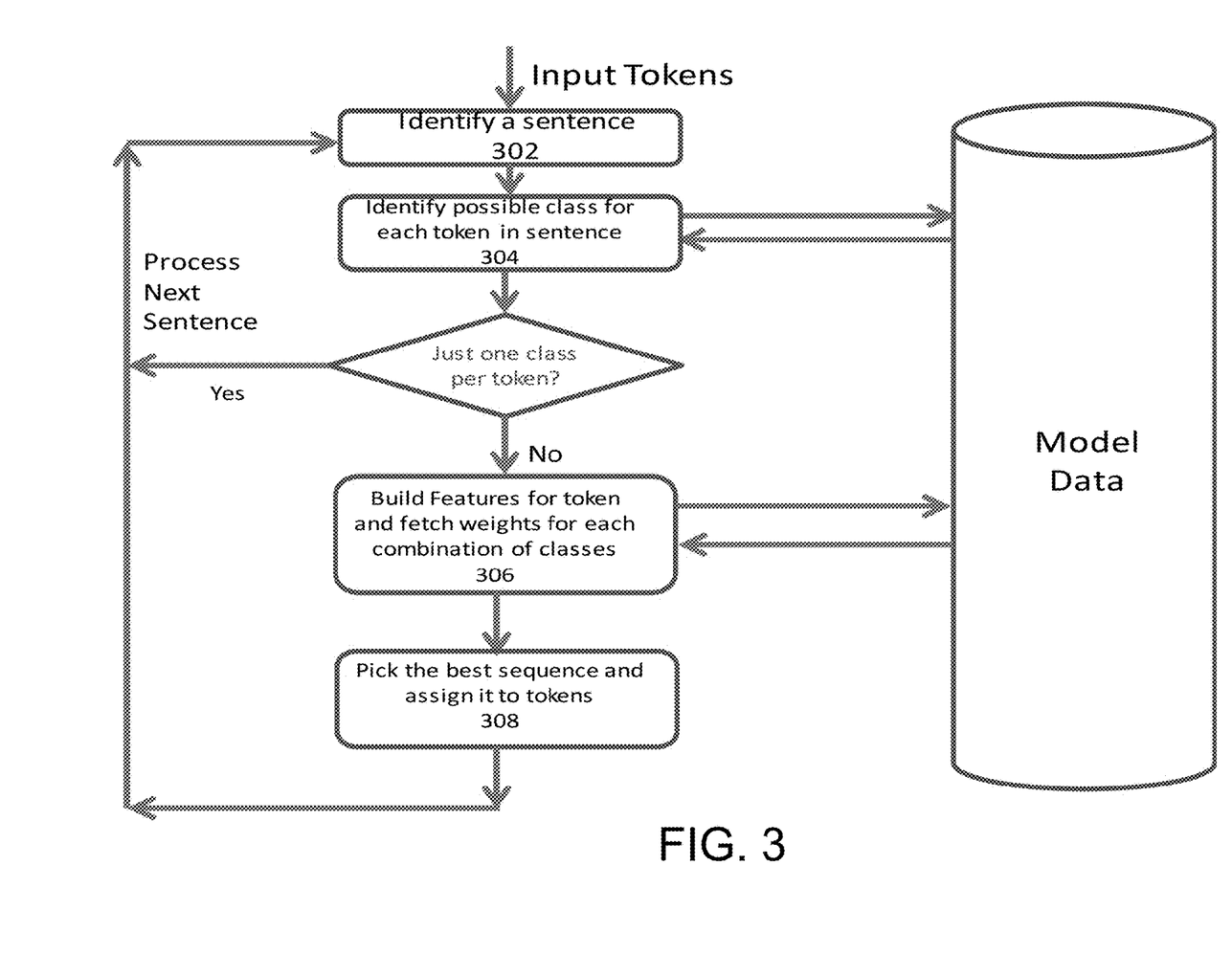
FIG. 3 depicts a flowchart of an example of a process to support sequence tagging/classification in accordance with some embodiments.

In some embodiments, the tagger 106 is configured to tag the stream of tokens one sentence at a time via sequence tagging by utilizing a sequence classifier 114 of the classifier 110. FIG. 3 depicts a flowchart of an example of a process to support sequence tagging/classification. As shown by the example of FIG. 3, the sequence classifier 114 is configured to identify a sentence in the stream of tokens at Step 302 and identify possible classes for each token in the sentence at Step 304. If more than one class has been identified for the token, the sequence classifier 114 is configured to build feature identifiers for the token and fetch weights for each combination of the identified classes from the model data table at Step 306. The sequence classifier 114 then picks the best sequence of tags (via, e.g., Viterbi Algorithm) at Step 308, wherein the best sequence scores the highest among all combinations.

In the example of FIG. 1, the parser 108 is configured to parse tokens output by the tokenizer 104 and/or the tagged tokens output by the tagger 106 and create a parse tree for the tagged tokens via a plurality of shift and/or reduce transitions based on a trained machine learning model. The parser 108 then outputs the parse tree to the next stage for further processing. A training module of the parser 108 trains the machine learning model and generates model data as discussed above, which is then used by the parser 108 to generate constituent and/or dependency trees as discussed below. Here, parsing or syntactic analysis is a process of analyzing a string of symbols, either in natural language or in computer programming languages, conforming to the rules of formal grammar. Here, the programming languages are specified in terms of a deterministic context-free grammar, hence parsing and output by the parser 108 are deterministic. Natural languages, on the other hand, can have substantial ambiguity in the structure since they can be made in different contexts, making parsing probabilistic and hence complex even when the natural language inputs are grammatically correct. The parser 108 is thus configured to choose the most probable natural language statement based on what the parser 108 has seen in the past (training data) or context of the statement.

Figure 4A:
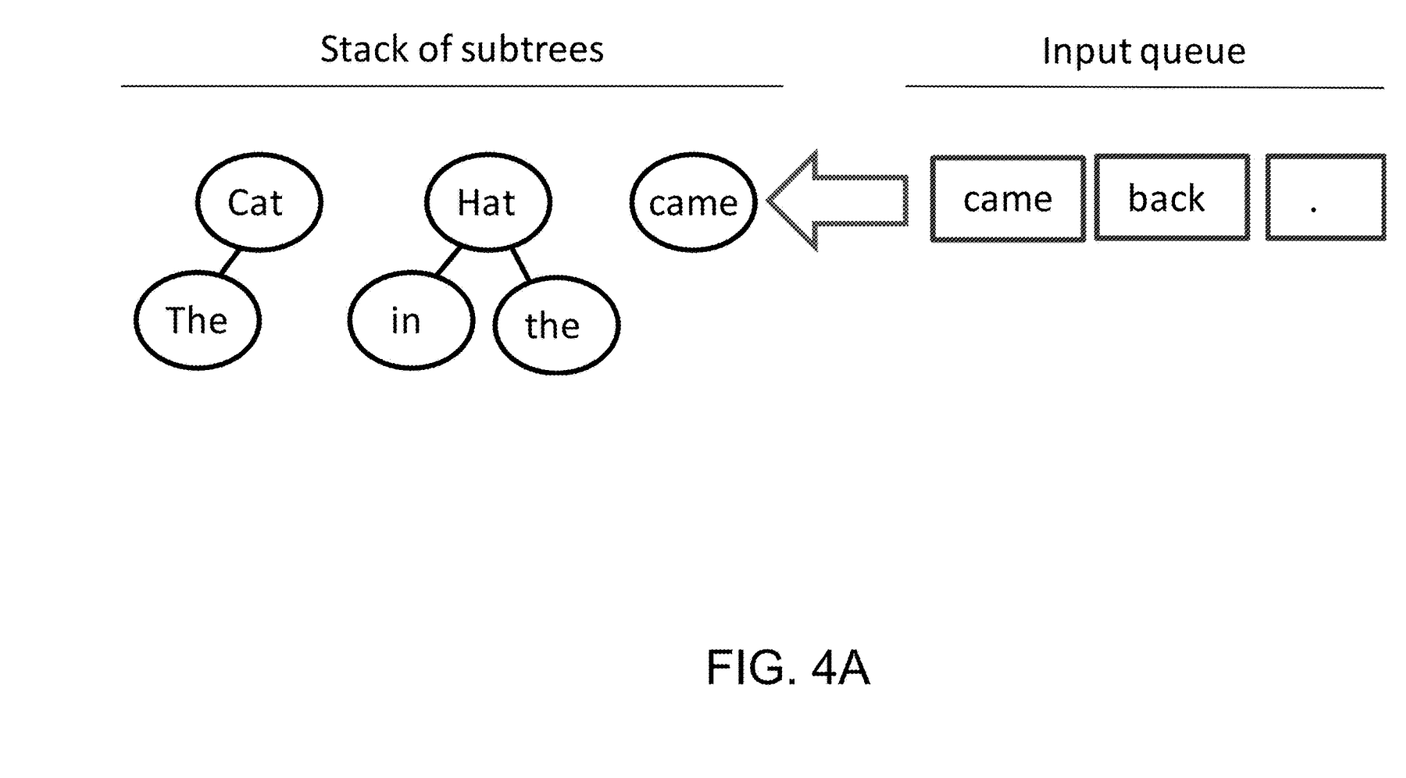
FIG. 4A depicts an example of a shift transition, where a token from an input queue to the parser are shifted to create a stack of subtrees of tokens in accordance with some embodiments.
Figure 4B:
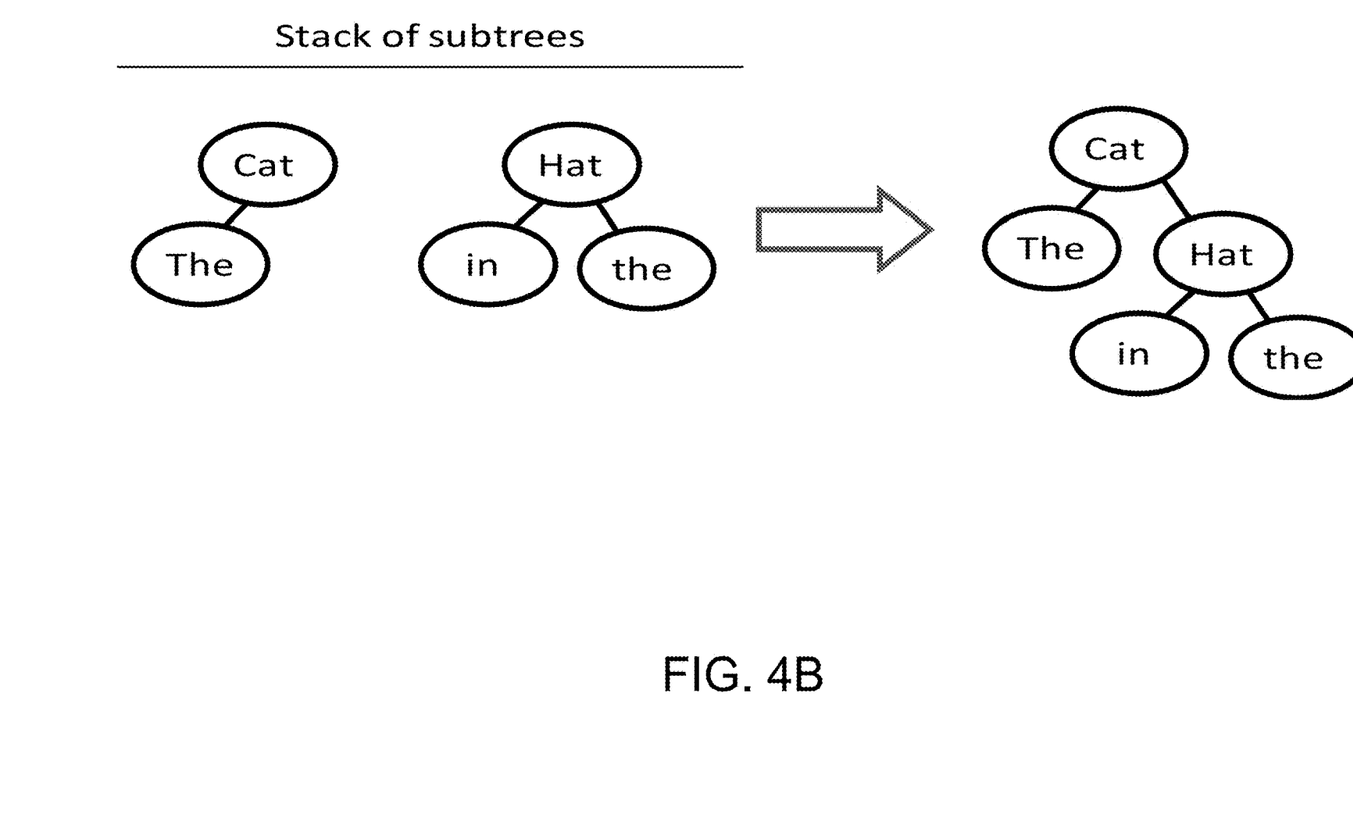
FIG. 4B depicts an example of a reduce transition, which reduces the number of subtrees in the stack by merging one or more subtrees into one in accordance with some embodiments.
Figure 5:
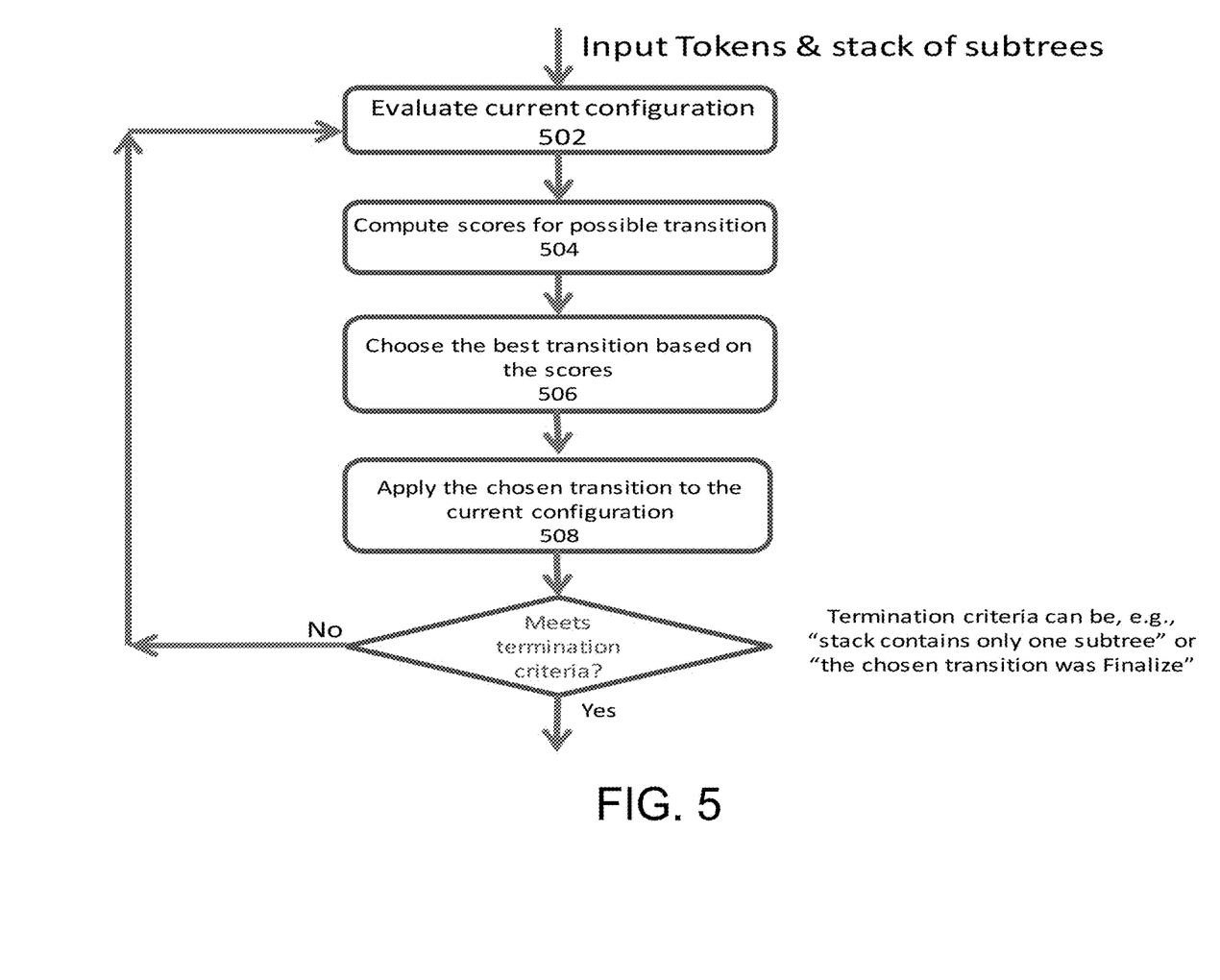
FIG. 5 depicts a flowchart of an example of a process to build a parse tree via shift-reduce parsing cycles in accordance with some embodiments.

In some embodiments, the parser 108 is a shift-reduce parser, which produces the parse tree via a series of transitions, each of which is a shift transition (moving a word off the input queue to a new sub-tree), a reduce transition (building up a piece of an existing sub-tree), or a finalize transition (which ends the parsing). Since the parse time of the shift-reduce parser is linear to the number of words, it is much faster than a chart parser that keeps track of different possible parses and chooses the most probable considering the entire sentence, which can be very slow. FIG. 4A depicts an example of a shift transition, where tokens from an input queue to the parser 108 are shifted to create a stack of subtrees of tokens. FIG. 4B depicts an example of a reduce transition, which reduces the number of subtrees in the stack by merging one or more subtrees into one (e.g., by making one subtree as a child of another subtree). In some embodiments, a finalize transition is necessary because having a single subtree is not reason enough to stop for the parser 108. For example, a reduce transition on a sentence "Go home" will create a verb phrase subtree containing the two words, leaving a single subtree. However, a further Unary transition is required to add a sentence node above the verb phrase node and then the finalize transition can happen and the parsing can stop. FIG. 5 depicts a flowchart of an example of a process to build a parse tree via shift-reduce parsing cycles. As shown by the example of FIG. 5, the parser 108 is configured to evaluate features of the current configuration of input tokens to be processed and stack of subtrees of a sentence at Step 502 and compute scores of the possible transitions for the current configuration at Step 504. The parser 108 then chooses the best transition based on the computed cores at Step 506 and applies the chosen transition to the current configuration at Step 508. The parser 108 is configured to repeat the steps above until the termination criteria are met. The termination criteria can be, e.g., the entire sentence is reduced to a single parse tree ("stack contains only one subtree") or the chosen transition is a finalize transition.

Figure 6A:
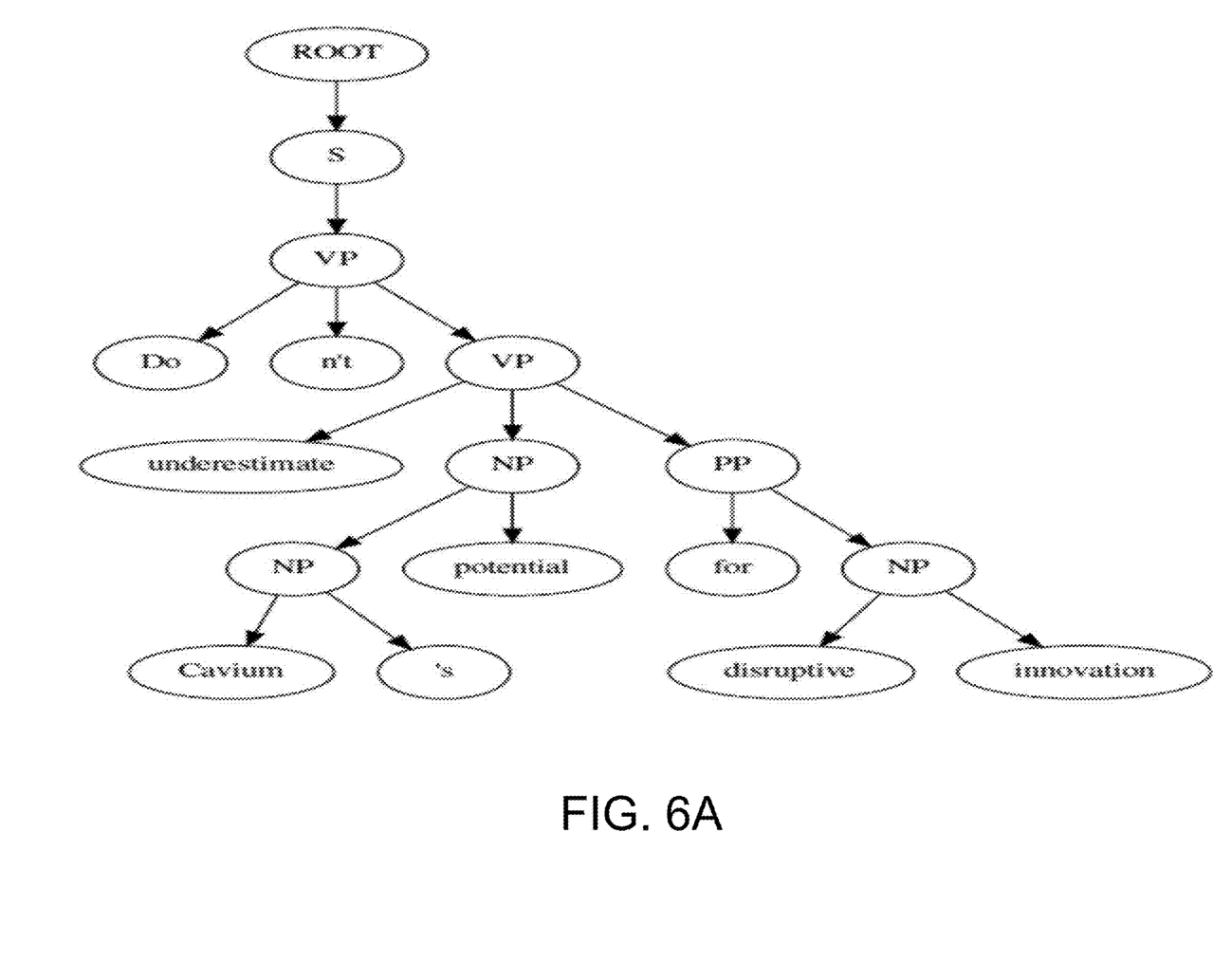
FIG. 6A depicts an example of a constituent tree for a sentence in accordance with some embodiments.

In some embodiments, the parser 108 is configured to generate either a constituent tree for constituent parsing or a dependency tree for dependency parsing of the input tokens, respectively, or both, for parsing of sentences in natural languages. For constituent parsing, where a sentence is broken into words or phrases, wherein the tree includes a plurality of terminal or leaf nodes representing the words and a plurality of non-terminal nodes representing the types (constituents) of the words/phrases and/or syntactically important sections of the sentence with the edges unlabeled. FIG. 6A depicts an example of a constituent tree for the sentence of "Don't underestimate Cavium's potential for disruptive innovation." For construction of the constituent tree, the parser 108 evaluates a plurality of features of the current configuration of input token streams to be processed and the stack of subtrees. For a non-limiting example, a typical feature is "the POS tag at the top of the stack." If that tag is, e.g., a noun, the parser 108 looks up "the POS tag at the top of the stack is a noun" in its table of feature values and returns the feature's set of weights for the possible transitions. The parser 108 then adds the weights from all of the features and chooses the best transition.

Figure 6B:
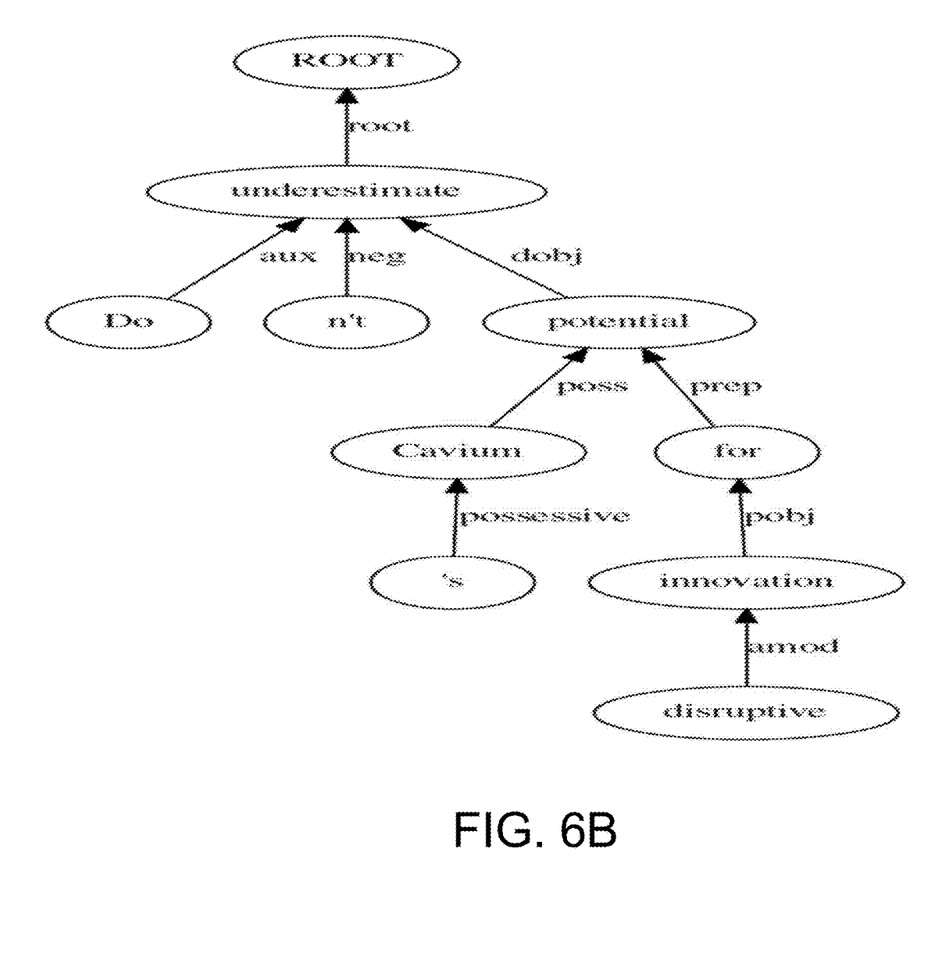
FIG. 6B depicts an example of a dependency tree for the same sentence of FIG. 6A in accordance with some embodiments.
Figure 7:
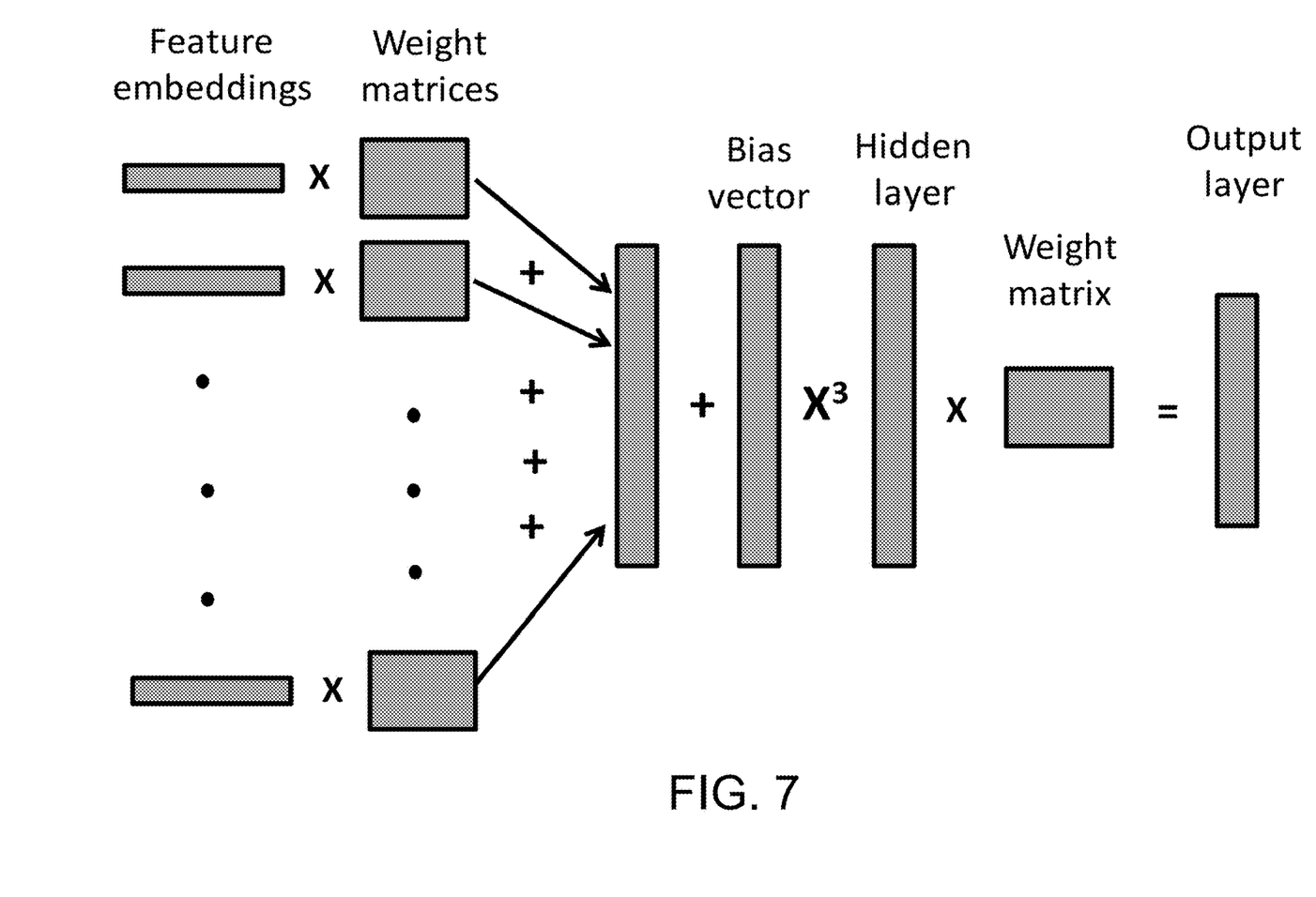
FIG. 7 depicts an example of a neural network for construction of the dependency tree in accordance with some embodiments.

For dependency parsing, where each word in the sentence is connected to another according to their relationship, wherein the nodes in the dependency tree are words and edges are labeled with the relationship between the words. FIG. 6B depicts an example of a dependency tree for the same sentence of FIG. 6A—"Don't underestimate Cavium's potential for disruptive innovation." For construction of the dependency tree, the parser 108 may use a neural network to evaluate a plurality of features of the configuration and chooses a transition. For a non-limiting example, a typical feature is, again, "the POS tag at the top of the stack." Each word, tag, and dependency label is represented in a dependency parsing model by a multi-element vector or "embedding," wherein the features look up the multi-element vector for its value. If two features are both, e.g., "noun," they will return the same embedding value. FIG. 7 depicts an example of a neural network for construction of the dependency tree. In the example of FIG. 7, a plurality of vectors/features embedding form the input to the neural network, wherein each of the vectors is multiplied by a unique weight matrix, resulting in a multi-element vector. These vectors are added up to generate a middle, "hidden" layer of the neural network, with a bias vector added to it and a nonlinear function (e.g., $x^3$) applied to each element. Finally, the hidden layer is multiplied by a two-dimensional weight matrix to create an output layer, containing one score for each possible transition. The parser 108 then chooses the highest scoring transition. Here, the embeddings, the weight matrices, and the bias vector form the dependency parsing model, which is built by training.

In the example of FIG. 1, the classifier 110 is a common block utilized by the tagger 106 and the parser 108 to perform their machine learning approaches used for classification for tagging and parsing, respectively, as discussed above. Each of the tagger 106 and the parser 108 extracts their corresponding features from their input data and sends those extracted features to the classifier 110, which then classifies the features and returns the class(es) of the features back to the tagger 106 and the parser 108, respectively. For example, the tagger 106 is configured to utilize the classifier 110 to assign part of speech (POS)/NER tags to the input tokens while the constituent and/or dependency parser 108 is configured to utilize the classifier 110 to decide a shift, reduce or finalize transition at each parse cycle. In the case of parsing, separating the classifier 110 out of the parser 108 allows for mixing and matching of any type of the parser 108 with any method of transition selection to create, for example, a dependency parser that adds up feature weights, and a constituent parser that uses a neural network with or without embedding vectors. In some embodiments, the classifier 110 can also be used independently by the host 103 for any machine learning based classification or regression tasks, wherein the host 103 extracts features and passes them as input to the classifier 110 for classification.

In some embodiments, in addition to the greedy classifier 112 and the sequence classifier 114 discussed above, the classifier 110 also includes a neural network classifier 116 used for neural network processing including but not limited to processing via convolutional neural networks, deep neural networks, fully connected neural networks, etc. In some embodiments, the neural network classifier 116 is configured to provide a set of primitives that are frequently used in machine learning models and neural networks to enable implementation of any machine learning models or neural networks.

Figure 8:
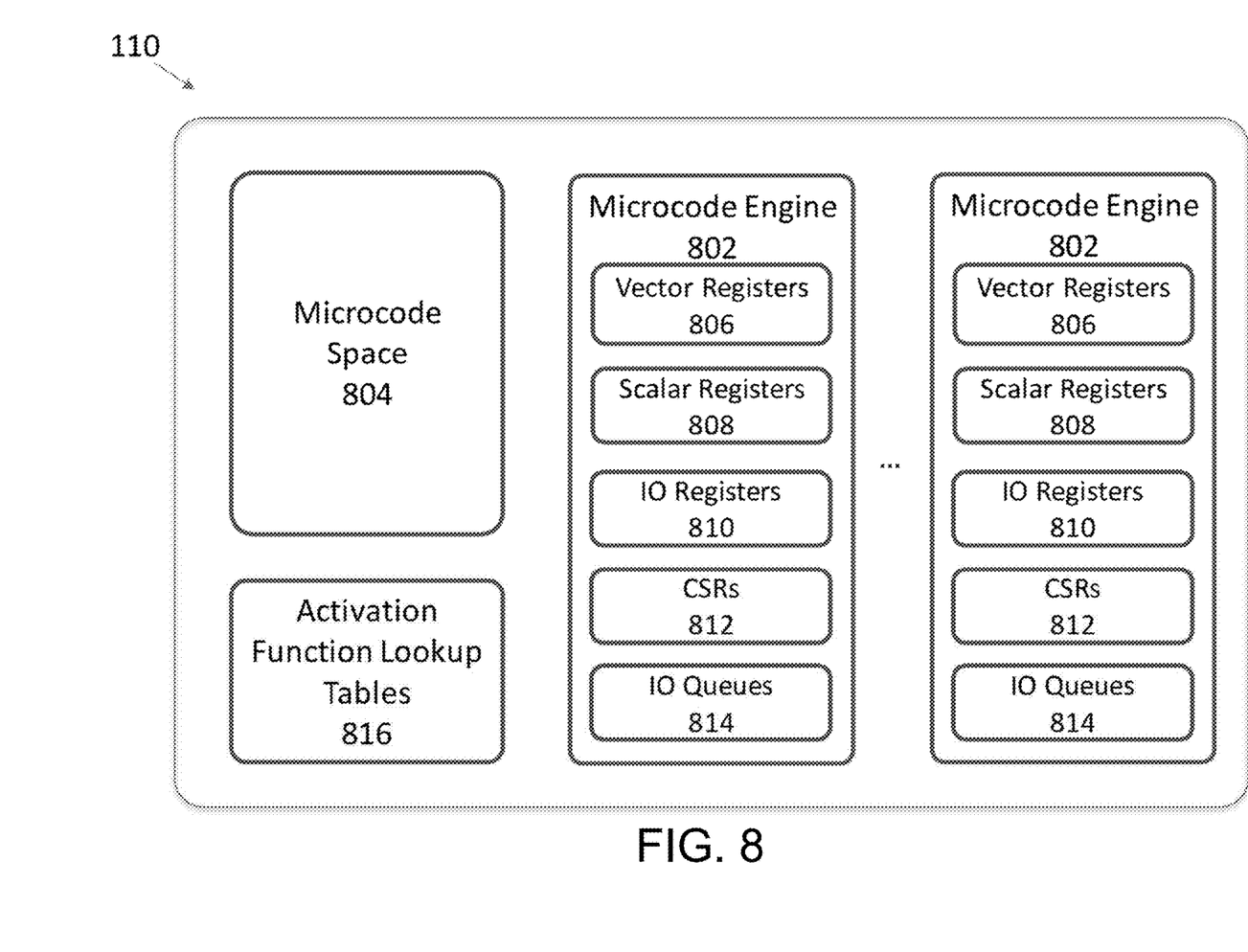
FIG. 8 depicts an example of a block diagram of the classifier in accordance with some embodiments.

FIG. 8 depicts an example of a block diagram of the classifier 110, wherein the classifier 110 includes a plurality of microcode engines 802 and an on-chip shared memory of microcode space 804. Here, each of the microcode engines 802 is configured to execute user-written, pre-loaded microcode/microinstructions read from the shared microcode space 804 to perform the classification/class prediction operations for the tagger 106 and the parser 108 as discussed above. In some embodiments, each microcode engine 802 includes a set of vector registers 806 and scalar registers 808 configured to store the intermediate results of classification computation. Each microcode engine 802 may further include a set of 10 registers 810, control/status registers 812, and 10 queues 814 from which the microcode engine 802 can read the input from the tagger 106 and the parser 108 as well as data from the host 103. The shared microcode space 804 maintains the microcode that implements the machine learning and neural network approaches, wherein the microcode can be accessed using an address or a key by the microcode engines 802. In some embodiments, the classifier 110 further includes a set of shared activation function lookup tables 816, which are utilized by the microcode engines 802 to apply an activation function at the respective neurons in a neural network, wherein each of the neurons needs an activation function to be applied after all synapse weights are added.

In some embodiments, all arithmetic instructions of the microcode have three operand formats with destination and sources can be found at fixed locations in the instruction, wherein the arithmetic instructions can be used by the microcode engines 802 to perform arithmetic operations on vectors and scalars in the vector registers 806 and scalar registers 808, respectively. Any arithmetic operations/functions can be mapped to elements in the vectors using the activation function lookup tables 816. In some embodiments, large vectors can be defined using multiple vector registers 806 and all arithmetic operations can be performed on those large vectors by the microcode engines 802. Here, all common reduce transitions/operations on the vectors including but not limited to finding the sum of all elements in a vector, finding the index of maximum/minimum value in a vector, counting the non-zero elements in a vector, etc., are supported by the microcode engines 802. Using the control/status registers 812, the microcode engines 802 is configured to control the width of a fixed/floating point number and the number of fractional bits in the fixed point numbers. In some embodiments, the microcode engines 802 is also configured to use compare and branch instructions for branching and looping inside microcode.

After the pipeline of text analytics processing utilizes one or more of the tokenizer 104, the tagger 106, the parser 108, and the classifier 110 to convert a steam of unstructured data to structured data, the TAP 102 is configured to output the structured data to be stored in a database and/or used to build a black or white list. The structured data can then be processed by a separate host for various text analytics processing applications, such as sentiment analysis, named entity recognition, summarization, categorization, relationship extraction, etc.

Figure 9:
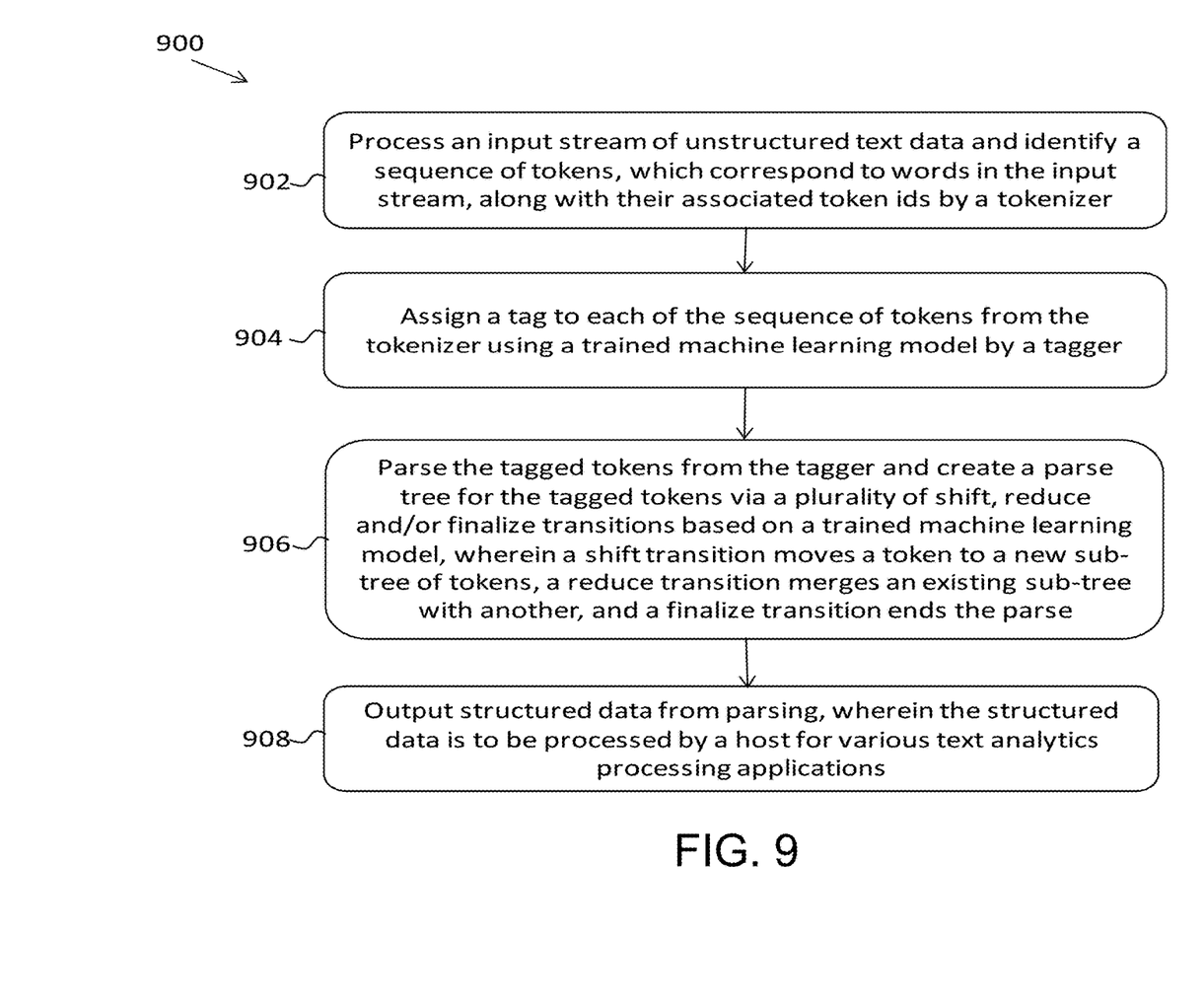
FIG. 9 depicts a flowchart of an example of a process to support hardware-based text analytics processing in accordance with some embodiments.

FIG. 9 depicts a flowchart of an example of a process to support hardware-based text analytics processing. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 9, the flowchart 900 starts at block 902, where an input stream of unstructured text data is processed and a sequence of tokens, which correspond to words in the input stream, are identified along with their associated token ids by a tokenizer. The flowchart 900 continues to block 904, where a tag is assigned to each of the sequence of tokens from the tokenizer using a trained machine learning model by a tagger. The flowchart 900 continues to block 906, where the tagged tokens from the tagger are parsed and a parse tree is created for the tagged tokens via a plurality of shift, reduce and/or finalize reduce transitions based on a trained machine learning model by a parser, wherein a shift transition moves a token to a new sub-tree of tokens while a reduce transition merges an existing sub-tree with another, and a finalize transition ends the parse. The flowchart 900 ends at block 908, where structured data from parsing is outputted, wherein the structured data is to be processed by a host for various text analytics processing applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based programmable text analytics processor (TAP) having a plurality of components, comprising:
a tokenizer configured to process an input stream of unstructured text data and identify a sequence of tokens, which correspond to words in the input stream, along with their associated token ids;
a tagger configured to assign a tag to each of the sequence of tokens from the tokenizer using a trained machine learning model;
a parser configured to parse the tagged tokens from the tagger and create a parse tree for the tagged tokens via a plurality of shift, reduce and/or finalize transitions based on a trained machine learning model, wherein a shift transition moves a token to a new sub-tree of tokens, a reduce transition merges an existing sub-tree with another, and a finalize transition ends the parse;
a classifier configured to perform classification for tagging and parsing by accepting features extracted by the tagger and the parser, classifying the features and returning classes of the features back to the tagger and the parser, respectively.

2. The processor of claim 1, wherein:
the TAP is configured to accept a plurality of instructions from a host and submit the instructions to one or more of the tokenizer, the tagger, the parser, and the classifier.

3. The processor of claim 2, wherein:
the host is configured to form a text analytics processing pipeline of one or more of the tokenizer, the tagger, the parser, and the classifier in any order that is suited for a text analytics functionality/application by providing an output from one component in the pipeline as input to another component in the pipeline.

4. The processor of claim 3, wherein:
the TAP is configured to output structured data from the text analytics processing pipeline, wherein the structured data is to be processed by a separate host for various text analytics processing applications.

5. The processor of claim 3, wherein:
different machine learning models are used at different components of the text analytics processing pipeline, wherein, at runtime, a component of the text analytics processing pipeline is configured to
extract features from an un-classified document based on a machine learning model trained by one or more training documents having the features classified;
lookup values of the features from the trained model and compute output values of the machine learning model;
classify the un-classified document using the computed output values.

6. The processor of claim 1, wherein:
the tokenizer is configured to identify the tokens in the stream of text data via a regular expression-based approach by traversing a deterministic finite automaton (DFA) graph, which is compiled based on one or more user-specified regular expressions and their respective actions for tokenization.

7. The processor of claim 1, wherein:
the tokenizer is configured to identify the tokens in the stream of text data by identifying word boundaries via a language model-based approach by adopting a model for a specific language during tokenization.

8. The processor of claim 1, wherein:
each tag is one of part of speech, named entity, sentiment, and relation.

9. The processor of claim 1, wherein:
the tagger is configured to extract features for a token in order to assign a tag to it based on one or more feature identifiers, wherein the feature identifiers are loaded into a model data table of feature identifiers.

10. The processor of claim 1, wherein:
the tagger is configured to examine the features of not only the current token but also its immediate and/or subsequent neighbors when assigning the tag to the token.

11. The processor of claim 1, wherein:
the tagger is a part of speech (POS) tagger, which is configured to examine the text in certain language and assign a part of speech tagger to each token in the text.

12. The processor of claim 1, wherein:
the tagger is configured to tag the stream of tokens one token at a time via greedy tagging by utilizing a greedy classifier of the classifier, wherein the greedy classifier is configured to
identify possible classes for each token;
build one or more feature identifiers for the token and fetch weights of the feature identifiers from a model data table if more than one class has been identified for the token;
add the weights together and pick the class having the highest score.

13. The processor of claim 1, wherein:
the tagger is configured to tag the stream of tokens one sentence at a time via sequence tagging by utilizing a sequence classifier of the classifier, wherein the sequence classifier is configured to
identify a sentence in the stream tokens and identify possible classes for each token in the sentence;
build feature identifiers for the token and fetch weights for each combination of the identified classes from the model data table if more than one class have been identified for the token;
pick the best sequence of tags, wherein the best sequence scores the highest among all combinations.

14. The processor of claim 1, wherein:
the parser is configured to
evaluate features of current configuration of the tagged tokens to be processed and a stack of subtrees of a sentence;
compute scores of the possible transitions for the current configuration
choose the best transition based on the computed scores and apply the chosen transition to the current configuration;
repeat the steps above until either the entire sentence is reduced to a single parse tree or the finalize transition has occurred.

15. The processor of claim 1, wherein:
the parser is configured to generate a constituent tree for constituent parsing, wherein a sentence is broken into words and wherein the constituent tree includes a plurality of terminal or leaf nodes representing the words and a plurality of non-terminal nodes representing syntactically important sections of the sentence.

16. The processor of claim 15, wherein:
the parser is configured to generate a dependency tree for dependency parsing, wherein each word in the sentence is connected to another according to their relationship, wherein nodes in the dependency tree are words and edges are labelled with the relationship between the words.

17. The processor of claim 1, wherein:
the classifier includes a neural network classifier used for neural network processing, wherein the neural network classifier is configured to provide a set of primitives that are frequently used in machine learning to enable implementation of a machine learning model or neural network.

18. The processor of claim 1, wherein:
the classifier includes a plurality of microcode engines and an on-chip shared memory of microcode space, wherein each of the microcode engines is configured to execute user-written, pre-loaded microcode/microinstructions read from the shared microcode space to perform the classification for the tagger and/or the parser.

19. The processor of claim 18, wherein:
the classifier further includes a set of shared activation function lookup tables, which are utilized by the microcode engines to apply an activation function at respective neurons in a neural network, wherein each of the neurons needs an activation function to be applied after all synapse weights are added.

20. A method to support hardware-based text analytics processing, comprising:
processing an input stream of unstructured text data and identifying a sequence of tokens, which correspond to words in the input stream, along with their associated token ids by a tokenizer;
assigning a tag to each of the sequence of tokens from the tokenizer using a trained machine learning model by a tagger;
parsing the tagged tokens from the tagger and creating a parse tree for the tagged tokens via a plurality of shift, reduce and/or finalize transitions based on a trained machine learning model by a parser, wherein a shift transition moves a token to a new sub-tree of tokens, a reduce transition merges an existing sub-tree with another, and a finalize transition ends the parse;
outputting structured data from parsing, wherein the structured data is to be processed by a host for various text analytics processing applications.

21. The method of claim 20, further comprising:
performing classification for tagging and parsing via a classifier, by accepting features extracted by the tagger and the parser, classifying the features and returning classes of the features back to the tagger and the parser, respectively.

22. The method of claim 20, further comprising:
accepting a plurality of instructions from a host and submitting the instructions to one or more of the tokenizer, the tagger, the parser, and the classifier.

23. The method of claim 20, further comprising:
forming a text analytics processing pipeline of one or more of the tokenizer, the tagger, the parser, and the classifier in any order that is suited for a text analytics functionality/application by providing an output from one component in the pipeline as input to another component in the pipeline.

24. The method of claim 23, further comprising:
adopting different machine learning models at different components of the text analytics processing pipeline, wherein, at runtime, a component of the text analytics processing pipeline is configured to
extracting features from an un-classified document based on a machine learning model trained by one or more training documents having the features classified;
looking up values of the features from the trained model and compute output values of the machine learning model;
classifying the un-classified document using the computed output values.

25. The method of claim 20, further comprising:
identifying the tokens in the stream of text data via a regular expression-based approach by traversing a deterministic finite automaton (DFA) graph, which is compiled based on one or more user-specified regular expressions and their respective actions for tokenization.

26. The method of claim 20, further comprising:
identifying the tokens in the stream of text data by identifying word boundaries via a language model-based approach by adopting a model for a specific language during tokenization.

27. The method of claim 20, further comprising:
extracting features for a token in order to assign a tag to it based on one or more feature identifiers, wherein the feature identifiers are loaded into a model data table of feature identifiers.

28. The method of claim 20, further comprising:
examining the features of not only the current token but also its immediate and/or subsequent neighbors when assigning the tag to the token.

29. The method of claim 20, further comprising:
examining the text in certain language and assigning a part of speech tagger to each token in the text.

30. The method of claim 20, further comprising:
tagging the stream of tokens one token at a time via greedy tagging by utilizing a greedy classifier of the classifier, wherein the greedy classifier is configured to identify possible classes for each token;
  build one or more feature identifiers for the token and fetch weights of the feature identifiers from a model data table if more than one class have been identified for the token;
  add the weights together and pick the class having the highest score.

31. The method of claim 20, further comprising:
tagging the stream of tokens one sentence at a time via sequence tagging by utilizing a sequence classifier of the classifier, wherein the sequence classifier is configured to
  identify a sentence in the stream of tokens and identify possible classes for each token in the sentence;
  build feature identifiers for the token and fetch weights for each combination of the identified classes from the model data table if more than one class have been identified for the token;
  pick the best sequence of tags, wherein the best sequence scores the highest among all combinations.

32. The method of claim 20, further comprising:
evaluating features of current configuration of the tagged tokens to be processed and a stack of subtrees of a sentence;
computing scores of the possible transitions for the current configuration
choosing the best transition based on the computed scores and apply the chosen transition to the current configuration;
repeating the steps above until the entire sentence is reduced to a single parse tree or a finalize transition has occurred.

33. The method of claim 20, further comprising:
generating a constituent tree for constituent parsing, wherein a sentence is broken into words and wherein the constituent tree includes a plurality of terminal or leaf nodes representing the words and a plurality of non-terminal nodes representing syntactically important sections of the sentence.

34. The method of claim 33, further comprising:
generating a dependency tree for dependency parsing, wherein each word in the sentence is connected to another according to their relationship, wherein nodes in the dependency tree are words and edges are labelled with the relationship between the words.

\* \* \* \* \*